United States Patent [19]

Savard et al.

[11] 4,284,510

[45] *Aug. 18, 1981

[54] TWO ZONE PROCESS FOR BIOLOGICAL TREATMENT OF WASTE WATER

[75] Inventors: Guy Savard, Westmount; Robert G. H. Lee, Montreal; Derek Hornsey, Roxboro, all of Canada

[73] Assignee: Canadian Liquid Air Ltd./Air Liquide Canada LTEE., Montreal, Canada

[*] Notice: The portion of the term of this patent subsequent to Mar. 11, 1997 has been disclaimed.

[21] Appl. No.: 92,283

[22] Filed: Nov. 8, 1979

Related U.S. Application Data

[63] Continuation-in-part of Ser. No. 905,008, May 11, 1978, Pat. No. 4,192,740, which is a continuation-in-part of Ser. No. 730,478, Oct. 7, 1976, abandoned.

[51] Int. Cl.$^3$ .............................................. C02F 3/26
[52] U.S. Cl. .................................. 210/614; 210/621; 210/626
[58] Field of Search .................... 210/3, 13, 14, 15, 7, 210/194, 197, 220, 221 R, 198 R, 4; 261/91, 93, 121

[56] References Cited

U.S. PATENT DOCUMENTS

| 3,133,017 | 5/1964 | Lambeth | 210/15 |
| 3,733,263 | 5/1973 | Mandt | 210/7 |
| 4,192,740 | 3/1980 | Savard et al. | 210/3 |

FOREIGN PATENT DOCUMENTS 584164 1/1977 Switzerland .............................. 210/220

Primary Examiner—Benoît Castel
Attorney, Agent, or Firm—Browdy and Neimark

[57] ABSTRACT

A biological waste water treatment carried out in a single tank. The conditions in the tank are controlled to provide a biological reaction zone containing waste water and biodegrading organisms and an overlying clarification zone from which an effluent of treated waste water flows. The recycle stream is continuously withdrawn from the biological reaction zone, supplemented with influent waste water, passed through an oxygen-dissolving device, and the supplemented stream returned to the reaction zone. The oxygen is monitored and supplied to satisfy the demands of the organisms and, at the same time, to keep the oxygen in solution. According to the invention, the supplemented recycle stream is continuously injected along the bottom of the biological reaction zone in a horizontal shallow inflow having a width substantially greater than its depth and a flow considerably greater than that of the influent. And, the recycle stream is withdrawn from near the bottom of the reaction zone, at a vicinity remote from the inflow, in an outflow having a substantially greater width than its depth. In this way there is created between the inflow and the outflow a horizontally relatively fast flowing undercurrent having an extensive uninterrupted interface with an overlying relatively quiescent body of mixed liquor flowing upwardly relatively slowly.

7 Claims, 2 Drawing Figures

TWO ZONE PROCESS FOR BIOLOGICAL TREATMENT OF WASTE WATER

CROSS REFERENCE TO RELATED APPLICATIONS

This application is a continuation-in-part of U.S. patent application Ser. No. 905,008, filed May 11, 1978, now U.S. Pat. No. 4,192,740 which, in turn, is a continuation-in-part of Application Ser. No. 730,478, filed Oct. 7, 1976 (now abandoned).

BACKGROUND OF THE INVENTION

1. Field of the Invention

This invention relates to the treatment of waste water to remove the B.O.D. More especially, the invention is concerned with a process and which permits the employment of a single vessel for carrying out biological reaction and the clarification by settling of the solids from the biological reaction.

2. Description of the Prior Art

U.S. Pat. No. 4,192,740, the disclosure of which is hereby incorporated by reference, as a basis for explaining the invention claimed, describes conventional methods of purification and biological treatment of waste water from municipal and industrial sources prior to discharge into natural water systems. It also describes prior proposals for modifying the conventional treatment as disclosed, for example, in U.S. Pat. No. 3,476,682 Albersmeyer and U.S. Pat. No. 3,983,031 Kirk, as well as the oxygen-dissolving device of Speece described in U.S. Pat. Nos. 3,643,403 and 3,804,255.

The invention of the prior U.S. Pat. No. 4,192,740 is directed to conducting both the biological treatment and the clarification of biologically treated water in a single vessel. Several embodiments of the invention are disclosed, one employing a device in which oxygen is dissolved in the mixed liquor and waste water influent in a conical chamber within the vessel, and the oxygenated mixed liquor recycled from the bottom of the conical chamber through a biological reaction zone and into the top of the chamber. In other forms of the invention disclosed, the recycle stream of oxygenated mixed liquor and influent is injected into the bottom of the biological reaction zone and a recycle stream withdrawn from that zone. In all cases the process is directed to careful monitoring of the oxygen, in the biological reaction zone, and adjusting the supply of oxygen in the incoming recycle stream to meet the oxygen demand of the biodegrading organisms and avoid the occurrence of undissolved oxygen in the form of gas bubbles in the biological reaction or clarification zones.

A process, according to U.S. Pat. No. 4,192,740 is carried out as follows.

Waste water is continuously passed through a single treating enclosure open to the atmosphere containing waste-degrading microorganisms, to which oxygen is added to sustain the microorganisms and from which the clarified effluent is continuously overflowed and from which excess sludge and gases are removed.

In starting up the process, there is initially established:

(a) in a lower part of the enclosure a biological reaction zone containing mixed liquor containing said microorganisms and in which a biological reaction to degrade the waste is conducted, (b) in an upper part of the enclosure a clarification zone in which clarified liquid rises and overflows, (c) between the reaction and clarification zones a transition zone in which the liquid of the mixed liquor rises and the solids settle.

Then, after these conditions have been established, there are then carried out continuously, the following steps.

A recycle stream of mixed liquor from the reaction zone is withdrawn and conducted through an oxygen-dissolving device disposed outside the reaction zone, influent waste water added to it, oxygen dissolved in the stream, and the supplemented stream injected into a lower part of the reaction zone remote from the vicinity of withdrawal.

The waste water is conducted into the recycle stream at a variable rate within a range related to the depth and surface area of the enclosure to provide a residence time within the reaction zone effective for the biodegradation of the waste and for the formation and settling of biological floc.

Oxygen is added to the recycle stream at a rate to provide an oxygen concentration within a controlled range below the saturation level of oxygen in the liquid effective to meet the oxygen demand of the organisms and maintained in contact with the liquid in a contact zone of the stream for a time and under a pressure such that the oxygen is dissolved in the liquid.

The overall flow rate of the recycle stream is controlled to a substantially constant rate several times that of the incoming waste water effective to provide:

(d) for dissolving the oxygen which is added to the recycle stream, (e) an amount of dilution of the recycle stream entering the reaction zone effective to prevent the oxygen coming out of solution at an upper part of the reaction zone.

The flow of the recycle stream entering the reaction zone is distributed to reach a substantial area of a lower part thereof:

(f) to provide a wide spread direct flow through the reaction zone, from the vicinity of injection to the vicinity of withdrawal, whereby there is controlled agitation effective to keep the solids dispersed, and good access of the organisms to the biodegradeable waste, (g) and to provide at an intermediate level of the enclosure, an upward velocity of the mixed liquor less than the settling rate of the solids, whereby there is maintained in the enclosure separate reaction and clarification zones intervened by a transition zone.

The concentration of dissolved oxygen in the reaction zone is continuously monitored to determine variations thereof, resulting from variations in the flow rate and concentration therein of waste.

The rate of addition of the oxygen to the recycle stream is periodically adjusted in response to variations in the oxygen concentration in the reaction zone to maintain the concentration within the controlled range and at a level where there is substantially avoided effervescence that would lead to gas bubbles rising into the clarification zone.

The effluent is continuously withdrawn from the clarification zone to keep pace with the influent waste water. And, continually excess sludge is removed from the reaction zone and carbon dioxide removed from the mixed liquor.

The parent applications disclose various embodiments of the invention including several different types of apparatus for carrying out the process.

SUMMARY OF THE INVENTION

The present invention aims to improve the effectiveness of a biological waste water treatment process of the type described in which the biological zone and the clarification zone are in a single reactor-clarifier vessel, specially in maintaining better stability in the reaction zone. Surprising results are accomplished in this respect, according to the invention, by injecting the influent stream horizontally into the bottom of the biological zone from one vicinity of the vessel, in the form of a wide, deep, relatively high-velocity high-dissolved oxygen inflow and drawing off mixed liquor from the biological zone, at a vicinity near the floor of the vessel remote from that of injection, in the form of a wide outflow, to provide a low dissolved oxygen recycle stream. Between the inflow and the outflow there is thus formed along the floor of the vessel across the width of the biological zone, an undercurrent of mixed liquor having a relatively high horizontal velocity. The extensive area of interface between the undercurrent of highly oxygenated horizontally moving supplemented recycle stream and the overlying mixed liquor permits substantially maximum oxygen content with the organism without causing undue turbulence to interfere with the settling of the suspended solids. A mixing action takes place in the interface zone and, undoubtedly, a certain amount of local turbulence in th form of eddies, but this does not interfere with the settling of the solids from the clarification zone. Oxygen is continuously dissolved in the recycle stream, outside the vessel, and combined with waste water influent, to form a supplemented recycle stream which forms the inflow.

The applicants have found that this brings about extensive and intimate contact between the dissolved oxygen and the mixed liquor afforded by the wide undercurrent running along the bottom of the biological zone so as to result in substantially maximum consumption of dissolved oxygen by the organisms. Maintaining the undercurrent near the floor of the vessel, it has been found, isolates the mixed liquor in the upper part of the biological zone from undue agitation which would cause mixing between the biological zone, and the clarification zone. It has also been found that the undercurrent, sweeping the floor of the vessel, keeps the solids in suspension and avoids sludge build-up.

Most of the liquid velocity for the mixing occurs in the horizontal direction. This increases stability, since with low upward velocity, the solids are allowed to settle out, and the effluent is low in suspended solids. So, compared with the prior art, with the present process there is available a higher capacity per unit of surface area with the same grade of effluent or, alternatively, a better grade effluent with the same capacity.

The mixed liquor may be drawn off from the biological zone by a pump located on the floor of the vessel. In this event, the behavior characteristics of the mixed liquor have been observed to be different from that of mixed liquor in a standard aeration system, in that the solids settle more readily, thus aiding clarification. The explanation may be that settling is encouraged by the vibration of the pump.

The size of the process vessel may vary. Its hydraulic depth must be effective to hold enough biomass for efficient treatment of incoming waste and to provide for a clarification zone. The depth may run from at least about 8 feet to as much as about 100 feet. The depth of the clarification zone must be effective to minimize the carryover of solids from the biomass by the effluent and should be at least about 2 feet. The distance between the vicinity of the inflow and the vicinity of the outflow should be long enough for the microorganisms to absorb the oxygen without becoming devoid of oxygen at the point of recycle which can be from about 6 feet and 200 feet or more. A preferred distance is between about 20 feet and about 100 feet. The initial depth of the inflow is great enough to prevent undue pressure drop and not great enough to allow mixed liquor to flow into the clarifier zone, preferably within the range from about 6 inches to about 6 feet. The width of the inflow is really only limited by the width of the vessel and preferably is the entire width of the vessel. The biological zone should have a minimum depth of at least about 2 feet and can extend to about 2 feet less than the hydraulic depth of the vessel. The calculated average linear velocity of the inflow at the vicinity of injection should be enough to prevent undue quiescence in the biological reaction zone without producing agitation which would cause the oxygen to come out of solution and is preferably within the range from about 1 to about 35 feet per minute, but this is not critical. The average horizontal velocity in the reaction zone is high enough to be effective to bring the oxygen into contact with the biomass and low enough so that the oxygen will be substantially consumed without the organisms becoming devoid of oxygen, preferably within the range from about ½ to about 20 feet per minute. The recirculation rate is effective to supply enough oxygen to carry out the process efficiently and is preferably within the range from about 1 to about 15 times the average waste water influent flow rate.

BRIEF DESCRIPTION OF THE DRAWINGS

Having thus generally described the invention, it will be referred to more specifically by reference to the accompanying drawings illustrating preferred embodiments, and in which.

DESCRIPTION OF THE PREFERRED EMBODIMENTS

Figure 1:
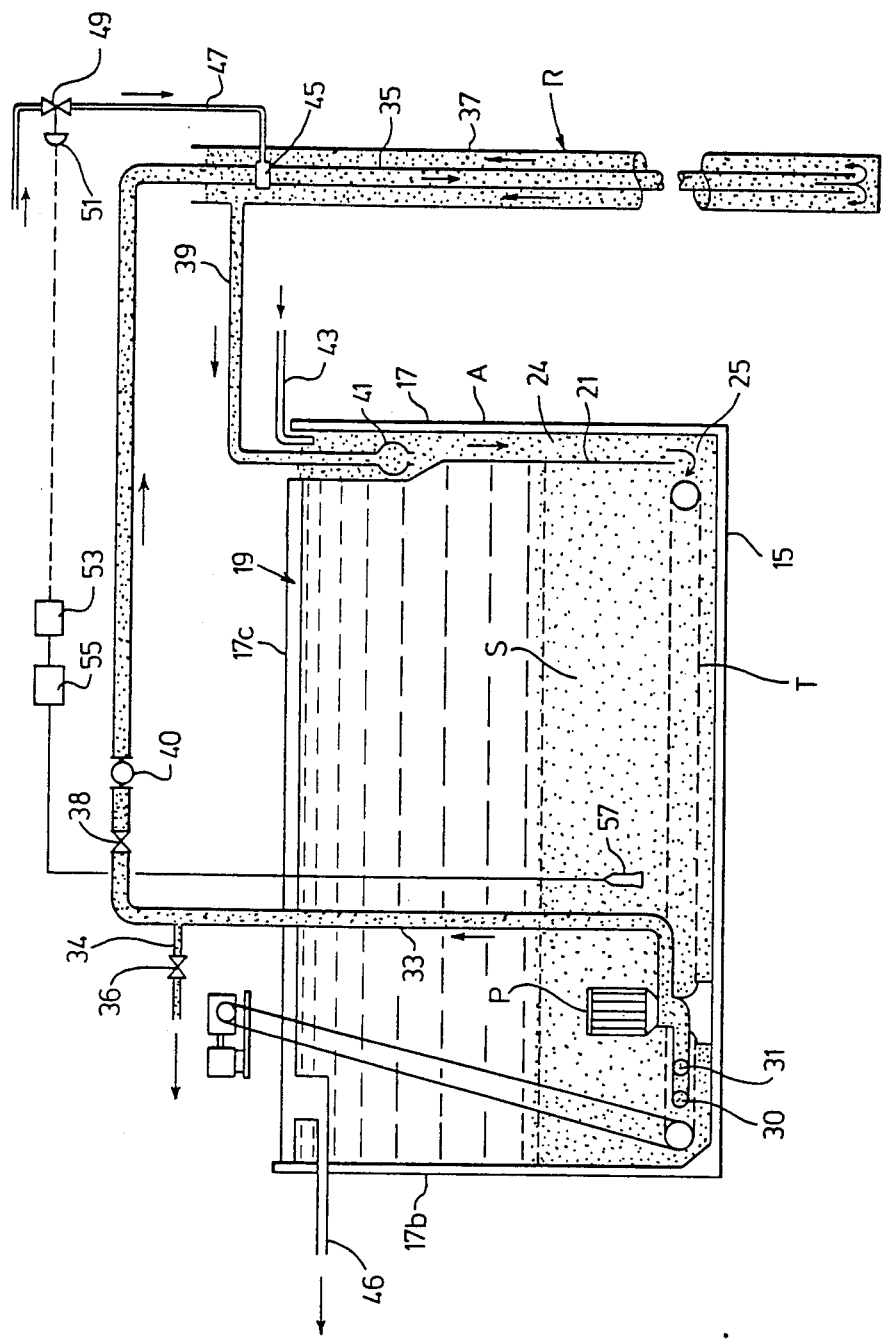
FIG. 1 is a diagrammatic illustration in vertical cross-section of one form of apparatus suitable for carrying out the process of the invention.

Referring more particularly to the drawings, there is shown a treatment tank A having a rectangular floor 15 and upwardly extending walls 17, 17b, 17c and a fourth wall (not shown) terminating in a top 19 open to the atmosphere. The tank contains a charge made up of a dispersion of a biological mass of biodegradeable material in oxygenated water, in a biological reactor zone S, and supernatant liquid in a clarification zone at the top of the tank A.

A false wall 21 extends from the fourth vertical wall (not shown) to the wall 17c and is spaced from the wall 17 to form a vertical passage or slot 24 for the influent defining the start of the inflow. The wall 21 extends from near the top of the tank to a point spaced from the floor 15 to provide for a narrow elongated inflow opening slot 25.

Towards the wall 17b there is a mixed liquor recycle pump P, resting on the floor 15. The pump P has an intake from a pair of orificed intake pipes 30 and 31 near the floor 15 and extending substantially the entire width of the tank. The intake pipes 30 and 31 lead to a recycle conduit 33 which extends upward through and out of the tank A and is connected to the downcomer 35 of an oxygen dissolving device R.

The device R has an outer tube 37, forming with the downcomer 35, an annulus 34. The upper part of the tube 37 is connected to an inflow conduit 39 which terminates in a nozzle 41 in a widened upper part of the passage 24. A waste water influent conduit 43 also enters the top of the passage 24 to deliver influent waste water from a source of supply. The tube 33 is provided with a sludge wasting outlet conduit 34 controlled by a valve 36. The tube 33 includes a flow control valve 38 and a flow meter 40 in series.

An oxygen injector 45 is operatively connected to the downcomer tube 35 near the top and to an oxygen supply conduit 47 leading from a suitable source of oxygen. The conduit 47 is controlled by a valve 49 having operating mechanism 51 controlled from a dissolved oxygen recorder-controller 53 connected to a dissolved oxygen analyzer 55. The oxygen analyzer 55 is, in turn, connected to a dissolved oxygen probe 57 suspended in the biological reactor zone within the sludge blanket S.

A sludge rake T is provided in the bottom of the tank to be used, if necessary, to prevent solids deposition. Generally speaking, however, the high velocity sweeping the floor 15 will normally inhibit the deposition of solids.

GENERAL OPERATION

Generally speaking, the operation of the device is as follows.

In starting up, the tank A is filled with a charge consisting of waste water and sludge containing the biodegrading organisms which eventually settle to the bottom of the tank and a flow of waste water is induced through the conduit 43 until circulation throughout the system is possible as will be described.

Once the system is operating, waste water influent continuously enters the conduit 43 and flows into the channel 24 where it is mixed with continuously recirculated mixed liquor from the biological reaction zone S in which oxygen is continuously dissolved in the oxygen dissolving device R. The aforesaid mixture of recycled and oxygenated mixed liquor and newly added effluent flows downward between the false wall 21 and wall 17 to the bottom of the tank A at the slot 25 (bottom of the tank) and the mixture is directed from the slot 25, horizontally, as an inflow across the full width of the tank bottom. The pump P withdraws the mixed liquor suspended solids uniformly, as an outflow, through the pipes 30 and 31, extending from one side of the tank to the other near the bottom of the tank and circulates this fluid through the tube 33 to the oxygen dissolving device R. The oxygenated fluid flows through the device R to the process tank A via tube 39.

By the push-pull effect of the head of liquid in the device R and the pump P, the incoming mixture of waste water influent, and mixed liquor containing dissolved oxygen, is injected, as an inflow, at a relatively high velocity through the slot 25 and an undercurrent of a dispersion of undissolved solids is caused to flow continuously across the floor 15 from the inlet 25 to the outlets 30 and 31, with a minimum of turbulence. The horizontal velocity of the undercurrent, is assisted, if necessary, by the action of the rake T, ensuring that the solids will not settle to the bottom 15.

Oxygen is ingested by the microorganisms from the undercurrent stream in its transit from the inlet 25 to the outlets 30 and 31. At the same time, the concentration of dissolved oxygen in the layer S are continuously monitored by the dissolved oxygen probe 57, in the biological zone S. The measurement of the oxygen count registers in the dissolved oxygen analyzer 55 and is recorded and controlled by the dissolved oxygen recorder-controler 53, which, in turn, controls the oxygen admitting valve 49. In this way the amount of dissolved oxygen in the biological reaction layer S may be kept within predetermined limits to support vigorous aerobic activity regardless of variations in the quantity and quality of waste water influent. The incoming influent is diluted, as it emerges through the slot 25 into the reaction zone S. This allows a substantial maximum concentration of oxygen to be contained in the incoming stream since, immediately it leaves the slot 25, it is diluted by entering the larger volume of mixed liquor S. This keeps dilution above the point where oxygen comes out as solution.

By proceeding as described, it is possible to build up a biomass, which may be of any desired depth in which the solids are maintained in suspension, due to the horizontal velocity of the liquid introduced at 25, and the vertical component of this velocity, which essentially averages out to the velocity equivalent to the overflow rate, i.e., to the rate of the influent flow. In other words, the vertical velocity of the M.L.S.S. is less than the settling rate of the solids in the M.L.S.S., which makes it possible to maintain a clarified zone above the mixed liquor in which the solids settle rather than being carried upward into the influent.

There is a high degree of stability of the interface between the mixed liquor zone and the clarified zone, despite the wide fluctuations in the influent flow rate. For example, the stability of the interface is maintained, even at overflow rates which vary between 300 and 1500 gals/ft$^2$/day. In actual fact, the biological reaction zone and the clarified zone do not merge immediately, one into the other, but there is actually a transition zone between the two containing settling solids.

It will be evident that, when oxygenated mixed liquor is returned to the biological zone S from the oxygenator R, there is a time lapse before this mixed liquor arrives at the withdrawal points 30, 31, to be recycled to the U-tube. For example, when the recycle rate is 1300 USG/M, and where the distance between the point of re-entry to the biological zone and the point of withdrawal is 20 ft. it takes about 2.8 minutes for the mixed liquor to travel this 20 feet distance. Thus, the average horizontal velocity is about 7 feet per minute. With a tank 21 ft. wide and a recycle flow rate of 1300 USG/Min., an undercurrent of mixed liquor with an average thickness of 1.25 feet thick moves across the bottom at an average velocity of 7 ft/minute. This velocity varies depending on the variation of the undercurrent and, thus, can vary 2 to 12 ft/min., even under otherwise constant process conditions.

Figure 2:
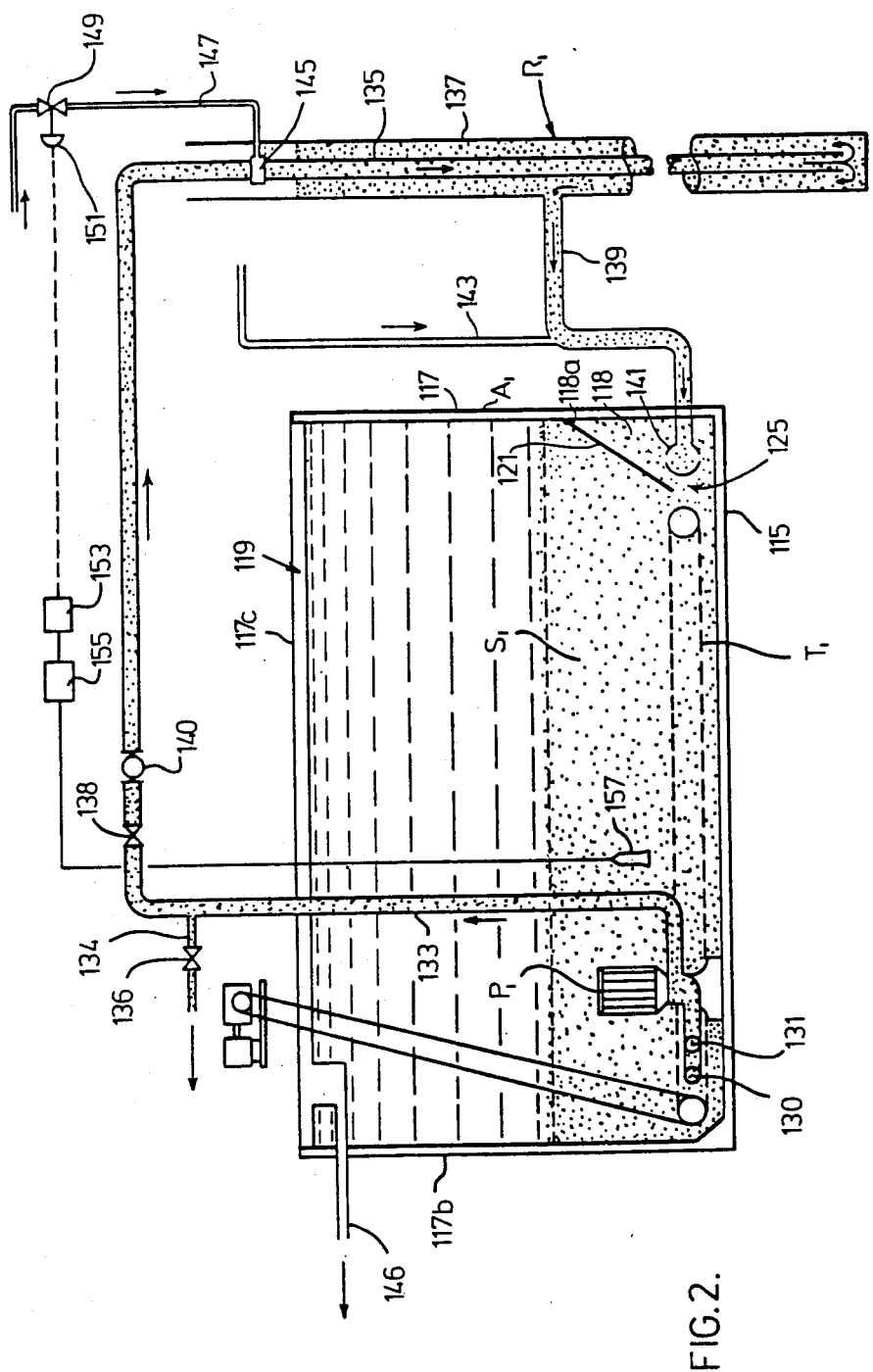
FIG. 2 is a similar diagrammatic illustration of another form of apparatus.

An alternative form of the invention is shown in FIG. 2 in which similar reference numerals to FIG. 1 have been employed for similar features but raised by 100 and the subscript 1 has been given to the reference letters identifying similar parts. In this case, the false wall 21 is replaced by a directional baffle 121 which extends diagonally downwards from the wall 117 to a point spaced from the floor 115 so as to leave between the bottom edge of the baffle 121 and the floor 115 an opening or slot 125 for the inflow of liquid to tank A. The baffle 121, which extends all the way from the fourth vertical wall to the wall 117c, forms with the walls 117, 117c and the fourth vertical wall, a pocket or compartment 118.

A conduit 139 leads from the oxygenator R and is connected to a waste water influent line 143. The conduit 139 enters the tank just above the floor 115 and is connected to a distributor 141 which extends across the tank for distributing a mixture of oxygenated mixed liquor and waste water influent coming in through the line 139. In this way, a relatively high velocity inflow of waste water influent and recycled oxygenated mixed liquor passes through the slot 125 between the baffle 121 and the floor 115.

The operation of the form of device, shown in FIG. 2, is similar to that of FIG. 1. The inflow through the slot 125 forms an undercurrent which passes along the floor 115, in the lower part of the biological reaction zone $S_1$, to form an outflow at the discharge pipes 130 and 131 under the suction of the pump $P_1$.

The directional baffle 121 provides a slot 125 of a size effective to impart a relatively high velocity to the liquid along the floor 115, as described in connection with the version of FIG. 1. The pocket 118 separates and traps undissolved gases from the oxygenated mixed liquor which will collect at the apex 118a from which there is a discharge to the atmosphere.

The effect of the horizontal motion of the fluid is to maintain the solids in suspension without, however, creating excessive turbulence which would hinder clarification by increasing the upward movement of the solids. The upward velocity of the fluid is less than the settling velocity of the solids in the M.L.S.S. which makes it possible to maintain a clarified zone above the mixed liquor. There is a high degree of stability of the interface between the mixed liquor zone and the clarified zone despite the flow occasioned by the recycle rate to prevent the settling out of the sludge and despite the wide fluctuations of the influent flow rate.

As one example, to illustrate these statements, the stability of the interface is maintained even at overflow rates which vary between 300 and 1500 gals/ft$^2$/day. In spite of the high circulation rate of the mixed liquor, it is possible to maintain a stable biological zone which is necessary for good clarification.

The biological zone contains sufficient oxygen to support vigorous aerobic activity. The dissolved oxygen decreases for example from approximately 30 mg per liter at the slot 125 to approximately 2 mg per liter at the pump inlets 130 and 131.

The ability of the biological reactor/clarifier to perform effectively is dependent on the combination of the system described above, the use of an external oxygen dissolving device, and the use of pure oxygen.

A vessel with a single pump has been illustrated. The process may be carried out in a wide vessel elongated in the direction of the length of the walls 17 and 17b in which there may be a common inlet slot 25 and a plurality of pumps P at the other end of the vessel for withdrawing the common undercurrent created.

The invention has also been illustrated with a rectangular vessel. It should be understood that the same principle may be employed in a circular or other shaped tank in which the recycle stream is injected at one vicinity near the bottom of the reaction zone and withdrawn at a remote vicinity near the bottom so as to create an undercurrent functioning as described.

The invention will be illustrated further by reference to the following typical example of a preferred procedure.

EXAMPLE

A typical reactor/clarifier tank was employed having dimensions of 20.5 feet wide by 24.5 feet long by 14 feet working depth (effective volume equals 52,600 gallons). The system is designed to process an average of 260,000 gallons per day.

The influent flow over a period surveyed varied widely and for the first 25 days of a given month, the average daily flow ranged from 142,000 to 427,000 gallons per day (average equals 248,000 GPD). The peak diurnal flows often exceeded 550,000 GPD (limit of the flow meter).

The average process performance for the first 21 days of the month are summarized as follows:

|  | Primary Effluent Feed to Two Zone | Two Zone Effluent |
|---|---|---|
| Total B.O.D.$_5$ (mg/l) | 109 | 22 |
| Soluble B.O.D.$_5$ (mg/l) | 53 | 2 |
| Suspended Solids (mg/l) | 58 | 21 |

The M.L.S.S. concentrations were allowed to rise during the month reaching 5,200 to 5,900 mg/l (as measured in the sludge recycle stream) by the 4th week. Based on the above concentration the system SRT is stabilized in the range of 9 to 12 days.

During the first 25 days of the month the sludge blanket occupied 8.4 feet of the total 14 feet liquid depth, or 60% of the liquid volume. The daily variation in blanket depth was from 5.8 feet to 11.2 feet. The hourly variations in the depth of the biological zone were minimal and affected mainly by the influent flow. Daily variations throughout the month occurred gradually and appeared to respond more to the mixed liquor wasting patterns than to diurnal changes in influent flow. The large circulation flow from the oxygen dissolving device apparently so dwarfed the net influent flow that influent diurnal variations (even 2/1 peak/average) react as minor disturbances with minimal effect on the total dynamic flow regime within the tank.

The oxygen dissolving device employed was a U-tube having a 10 inch diameter downcomer and a 20 inch outer shaft, and a 146 foot shaft depth. The U-tube consisted solely of a straight downcomer and a straight riser with no deliberate head loss (constrictions or mixers) built in to promote turbulence.

We claim:

1. A process of treating waste water containing biodegradeable waste to provide a clarified liquid effluent and a disposable sludge, in which waste water is continuously passed through a single treating enclosure open to the atmosphere containing waste-degrading microorganisms, to which oxygen is added to sustain the microorganisms and from which the clarified effluent is continuously overflowed and from which excess sludge and gases are removed; in which there is initially established a charge including (a) in a lower part of the enclosure a biological reaction zone containing mixed liquor containing said microorganisms and in which a biological reaction to degrade the waste is conducted, (b) in an upper part of the enclosure a clarification zone in which clarified liquid rises and overflows, and (c) between the reaction and clarification zones a transition zone in which the liquid of the mixed liquor rises and the solids settle; and continuously there is withdrawn from the biological reaction zone a recycle stream of mixed liquor from the reaction zone and the stream conducted through an oxygen-dissolving device disposed outside the reaction zone and influent waste water and oxygen are added to it; the thus supplemented stream is injected into a lower part of the reaction zone remote from the vicinity of withdrawal, the waste water is conducted into the recycle stream at a variable rate within a range related to the depth and surface area of the enclosure to provide a residence time within the reaction zone effective for the biodegradation of the waste and for the formation and settling of biological floc, oxygen is added to said recycle stream at a rate to provide an oxygen concentration within a controlled range below the saturation level of oxygen in the liquid effective to meet the oxygen demand of the organisms and maintaining it in contact with the liquid in a contact zone of said stream for a time and under a pressure such that the oxygen is dissolved in the liquid; the overall flow rate of said recycle stream is controlled to a substantially constant rate several times that of the incoming waste water effective to provide (d) for dissolving the oxygen which is added to the recycle stream, (e) an amount of dilution of the recycle stream entering the reaction zone effective to prevent the oxygen coming out of solution at an upper part of the reaction zone, the flow of said supplemented recycle stream entering the reaction zone is distributed to reach a substantial area of a lower part thereof, (f) to provide a wide spread direct flow through the reaction zone, from the vicinity of injection to the vicinity of withdrawal, whereby there is controlled agitation effective to keep the solids dispersed, and good access of the organisms to the biodegradeable waste, (g) and to provide, at an intermediate level of the enclosure, an upward velocity of the mixed liquor less than the settling rate of the solids, whereby there is maintained in the enclosure said separate reaction and clarification zones intervened by said transition zone; the concentration of dissolved oxygen in the reaction zone is continuously monitored to determine variations thereof resulting from variations in the flow rate and concentration therein of waste; the rate of addition of the oxygen to the recycle stream is periodically adjusted in response to variations in the oxygen concentration in the reaction zone to maintain said concentration within said controlled range and at a level where there is substantially avoided effervescence that would lead to gas bubbles rising into the clarification zone; the effluent is continuously withdrawn from the clarification zone to keep pace with the influent waste water; and the excess sludge is continuously removed from the reaction zone and carbon dioxide from the mixed liquor, comprising the steps of, continuously injecting along the bottom of the biological reaction zone said supplemented recycle stream in a horizontal shallow inflow having a width substantially greater than its depth, and withdrawing mixed liquor from near the bottom of the reaction zone at a vicinity remote from the inflow in an outflow having a substantially greater width than its depth, thereby to provide between the inflow and the outflow a horizontally flowing undercurrent having an extensive uninterrupted interface with an overlying relatively quiescent upwardly flowing body of mixed liquor, and in which, the depth of the charge is from about 8 feet to about 100 feet, the depth of the clarification zone is at least about 2 feet, the distance between the inflow and the outflow is from about 6 feet to about 200 feet, the initial depth of the inflow is within the range from about 6 inches to about 6 feet, the depth of the biological zone is at least about 2 feet, the calculated average linear velocity of the inflow at the vicinity of the injection is within the range from about 1 to about 35 feet per minute, the average horizontal velocity in the reaction zone is within the range from about $\frac{1}{2}$ to about 20 feet per minute, and the recirculation rate is within the range from about 1 to about 15 times the average waste water influent flow rate.

2. A process, as defined in claim 1, in which the tank is rectangular and the width of the inflow is substantially the entire width of the enclosure.

3. A process, as defined in claim 1, in which the ratio of length to width of the inflow is $\frac{1}{2}$ to 8 times.

4. A process, as defined in claim 1, in which the depth of the biological reaction zone is from about 2 feet to about 2 feet below the surface of the charge.

5. A process, as defined in claim 4, in which the depth of the biological reaction zone is from about 4 feet to about 2 feet less than the depth of the charge.

6. A process, as defined in claim 1, in which the overflow rate is up to about 1,500 gals, per sq. foot per day.

7. A process, as defined in claim 1, in which the recirculation rate is between about 2 and about 15 times the average waste water influent flow rate.

* * * * *